R. O. HAMMOND.
COLD HANDLE FOR COOKING UTENSILS.
APPLICATION FILED JULY 23, 1909.
979,847.
Patented Dec. 27, 1910.
2 SHEETS—SHEET 2.
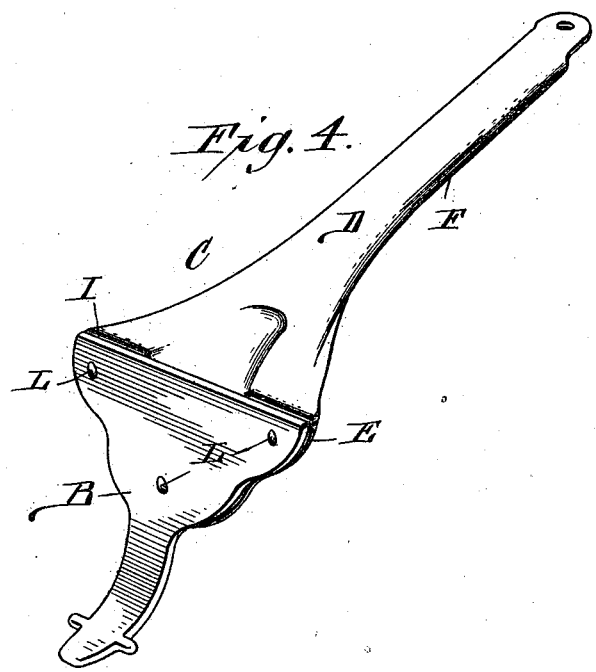
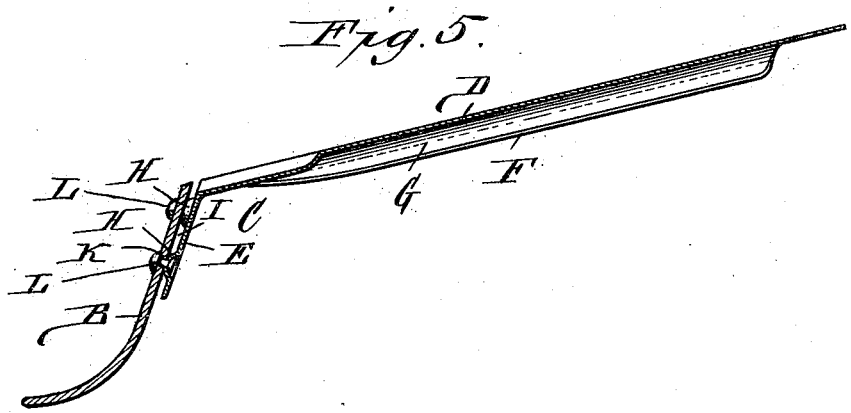
Witnesses:
Christ Feinle, Jr.,
Jacob S. Oberst, Jr.
Robert O. Hammond, Inventor.
By Emil Neuhardt
Attorney.

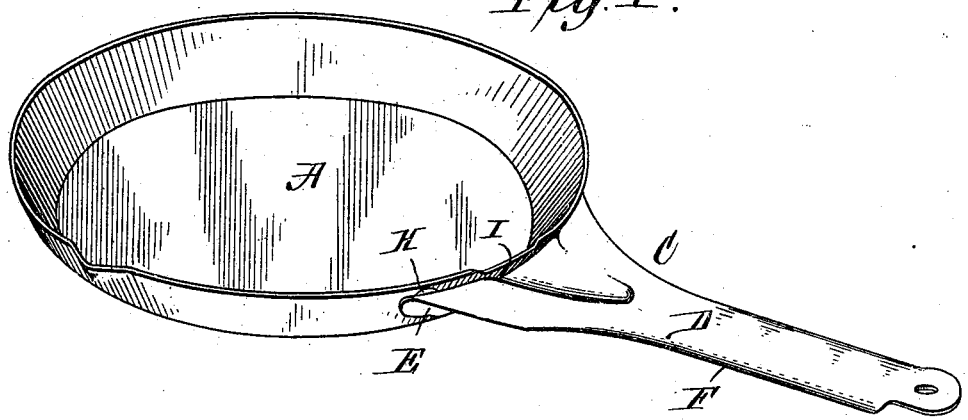
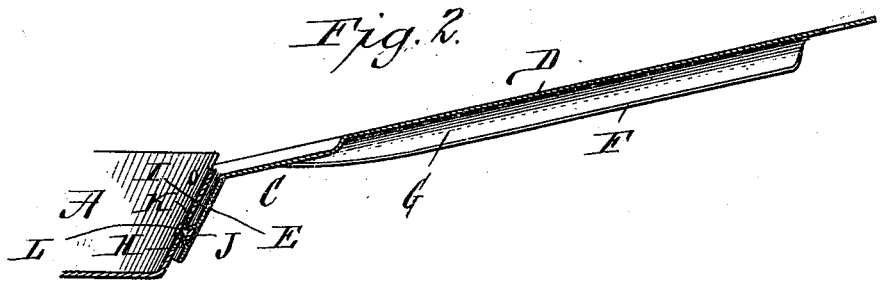
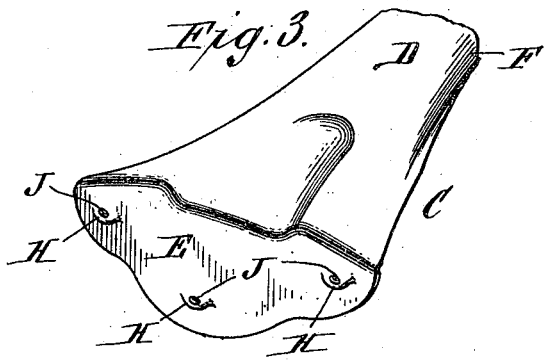

UNITED STATES PATENT OFFICE.

ROBERT O. HAMMOND, OF ROME, NEW YORK, ASSIGNOR OF ONE-HALF TO HYMEN A. EVANS, ONE-FOURTH TO CYRUS EDWIN TYLER, AND ONE-EIGHTH TO JESSE SHELDON TYLER, ALL OF ROME, NEW YORK.

COLD HANDLE FOR COOKING UTENSILS.

979,847.      Specification of Letters Patent.      Patented Dec. 27, 1910.

Application filed July 23, 1909. Serial No. 509,098.

*To all whom it may concern:*

Be it known that I, ROBERT O. HAMMOND, of Rome, in the county of Oneida and State of New York, have invented certain new and useful Improvements in Cold Handles for Cooking Utensils and the Like, of which the following is a specification.

My invention relates to cold handles for cooking utensils and the like, and its object is the production of a simple, durable, and inexpensive handle which is adaptable for connection to any article used on or with stoves and heated thereby.

The invention consists in the construction, arrangement, and combination of parts to be hereinafter described and particularly pointed out in the subjoined claims.

The invention will be fully understood from the following description and claims and when taken in connection with the accompanying drawings, in which—

Figure 1 is a perspective view of a frying pan or spider equipped with my invention. Fig. 2 is a longitudinal section through my improved handle and a portion of the body of the spider. Fig. 3 is a perspective view of the inner end of the handle. Fig. 4 is a perspective view of a griddle-lifter equipped with my improved handle. Fig. 5 is a central longitudinal section through said lifter.

As my improved handle is designed for use on various articles, I will term the part to which it is secured a serving utensil or tool.

In Figs. 1 and 2 the serving utensil is in the form of a frying pan or spider, designated A and in Figs. 4 and 5 the serving tool is in the form of a griddle-lifter B. They are merely representative of the applications possible for this improved handle.

C designates the handle which is preferably formed of sheet metal and has an elongated gripping-portion D and a wide securing-portion E at the inner end of said gripping-portion bent at an angle thereto. The longitudinal marginal portions of said gripping-portion are curved downward and inward from a point near the inner end to a short distance from the outer end thereof, as at F, thus providing a rounded edge so that the handle can be conveniently grasped and an air-space G which is open at opposite ends to permit the passage of air therethrough.

The securing-portion E is secured to the serving utensil or tool and is given the shape of the part of the utensil or tool to which it is secured. In Figs. 1 to 3, said securing-portion is curved to conform to the curved side of the body of the spider to which it is secured, while in Figs. 4 and 5, the part of the lid-lifter to which it is secured is made straight, and the securing-portion of the handle is made accordingly. Said securing-portion E has projections in the form of teats H which are formed on that side facing the article to which the handle is secured and they bear against said article and are so spaced that an even bearing is obtained. These projections or teats provide an air-passage I between the handle and the utensil or tool so that the heat of the latter will not be imparted to the gripping-portion of the handle, and as the projections or teats are formed so that they have only a slight bearing area, the small amount of heat imparted to the securing-portion of the handle will be absorbed or dissipated by the air passing through the air-passage I.

The securing-portion E of the handle is perforated at points where the projections or teats H are formed thereon, as at J, the perforation extending centrally through said projections or teats. Passing through said perforations and through registering perforations K in the serving utensil or tool are rivets L by means of which the handle is fastened in place. The heat imparted through the rivets is also absorbed or dissipated by the air passing in contact with the securing portion of the handle, thus leaving the gripping-portion thereof cold so that the serving utensil or tool can be easily handled.

Having thus described my invention, what I claim is,—

1. The combination of a serving-utensil or tool, and a handle secured thereto and having a securing-portion provided with spaced projections in contact with said utensil or tool and forming an air-passage between the latter and the handle and means for securing said handle to said utensil or tool at points coincident with said projections.

2. The combination of a serving-utensil or tool, and a handle having a hollow gripping-portion and a securing-portion at an angle to said gripping-portion, said securing-portion having spaced projections on its surface in contact with said utensil or tool to form an air-passage between the latter and said handle, and fastening-means for securing the handle to the utensil or tool.

3. The combination of a serving utensil or tool and a handle formed of sheet metal and comprising an elongated gripping portion and a securing portion, said gripping portion having its longitudinal marginal portion bent or curved underneath its center portion to provide an air space and said securing portion being bent at an angle to said gripping portion and having perforated teats bearing against the serving utensil or tool, and rivets passing through said perforated teats and through said utensil or tool.

In testimony whereof, I have affixed my signature in the presence of two subscribing witnesses.

ROBERT O. HAMMOND.

Witnesses:
ALICE ALMA HICKS,
CARRIE HICKS.